(12) United States Patent
Chee et al.

(10) Patent No.: US 10,581,263 B2
(45) Date of Patent: Mar. 3, 2020

(54) CHARGING CIRCUIT AND CONTROL METHOD THEREOF

(71) Applicant: ASUSTeK COMPUTER INC., Taipei (TW)

(72) Inventors: Kian-Ming Chee, Taipei (TW); Shin-Hong Wu, Taipei (TW); Wei-Chen Tu, Taipei (TW)

(73) Assignee: ASUSTEK COMPUTER INC., Taipei (TW)

( * ) Notice: Subject to any disclaimer, the term of this patent is extended or adjusted under 35 U.S.C. 154(b) by 79 days.

(21) Appl. No.: 15/919,322

(22) Filed: Mar. 13, 2018

(65) Prior Publication Data

US 2018/0269706 A1 Sep. 20, 2018

(30) Foreign Application Priority Data

Mar. 16, 2017 (TW) .............................. 106108778 A

(51) Int. Cl.
*H02J 7/00* (2006.01)
*H02J 7/34* (2006.01)

(52) U.S. Cl.
CPC .......... *H02J 7/0072* (2013.01); *H02J 7/0052* (2013.01); *H02J 7/345* (2013.01); *H02J 7/0026* (2013.01); *H02J 2007/0059* (2013.01)

(58) Field of Classification Search
CPC ........ H02J 7/0072; H02J 7/345; H02J 7/0052; H02J 2007/0059; H02J 7/0026
USPC ........................................................ 320/134
See application file for complete search history.

(56) References Cited

U.S. PATENT DOCUMENTS

| | | | | |
|---|---|---|---|---|
| 4,868,730 A | * | 9/1989 | Ward | F02P 3/0884 363/21.12 |
| 6,137,371 A | * | 10/2000 | Fukaishi | H03K 3/012 331/177 R |
| 7,466,189 B2 | * | 12/2008 | Sohara | H02M 3/07 327/536 |
| 8,080,900 B2 | * | 12/2011 | Corhodzic | G06F 1/263 307/66 |
| 2008/0100143 A1 | | 5/2008 | Lipcsei | |
| 2010/0213897 A1 | | 8/2010 | Tse | |

(Continued)

FOREIGN PATENT DOCUMENTS

| | | |
|---|---|---|
| CN | 204243832 U | 4/2015 |
| TW | 200826406 A | 6/2008 |

*Primary Examiner* — M Baye Diao
(74) *Attorney, Agent, or Firm* — McClure, Qualey & Rodack, LLP

(57) ABSTRACT

A charging circuit applied to a post-stage circuit includes a power converting circuit, a power storage circuit, a switching circuit and a processing circuit. The power converting circuit receives an external voltage and converts the external voltage to a charging voltage. The power storage circuit is coupled to the power converting circuit and receives the charging voltage to store the power. The switching circuit is coupled to the power converting circuit and the power storage circuit. The processing circuit is coupled to the switching circuit and controls the charging circuit operated in a first mode or a second mode. When operated in the first mode, the external voltage supplies power to the post-stage circuit. When operated in the second mode, the charging voltage supplies power to the post-stage circuit.

10 Claims, 7 Drawing Sheets

(56) References Cited

U.S. PATENT DOCUMENTS

2012/0080944 A1* 4/2012 Recker ............... H05B 37/0218
307/25
2014/0077595 A1* 3/2014 Kakuya ............... H01M 10/441
307/24

* cited by examiner

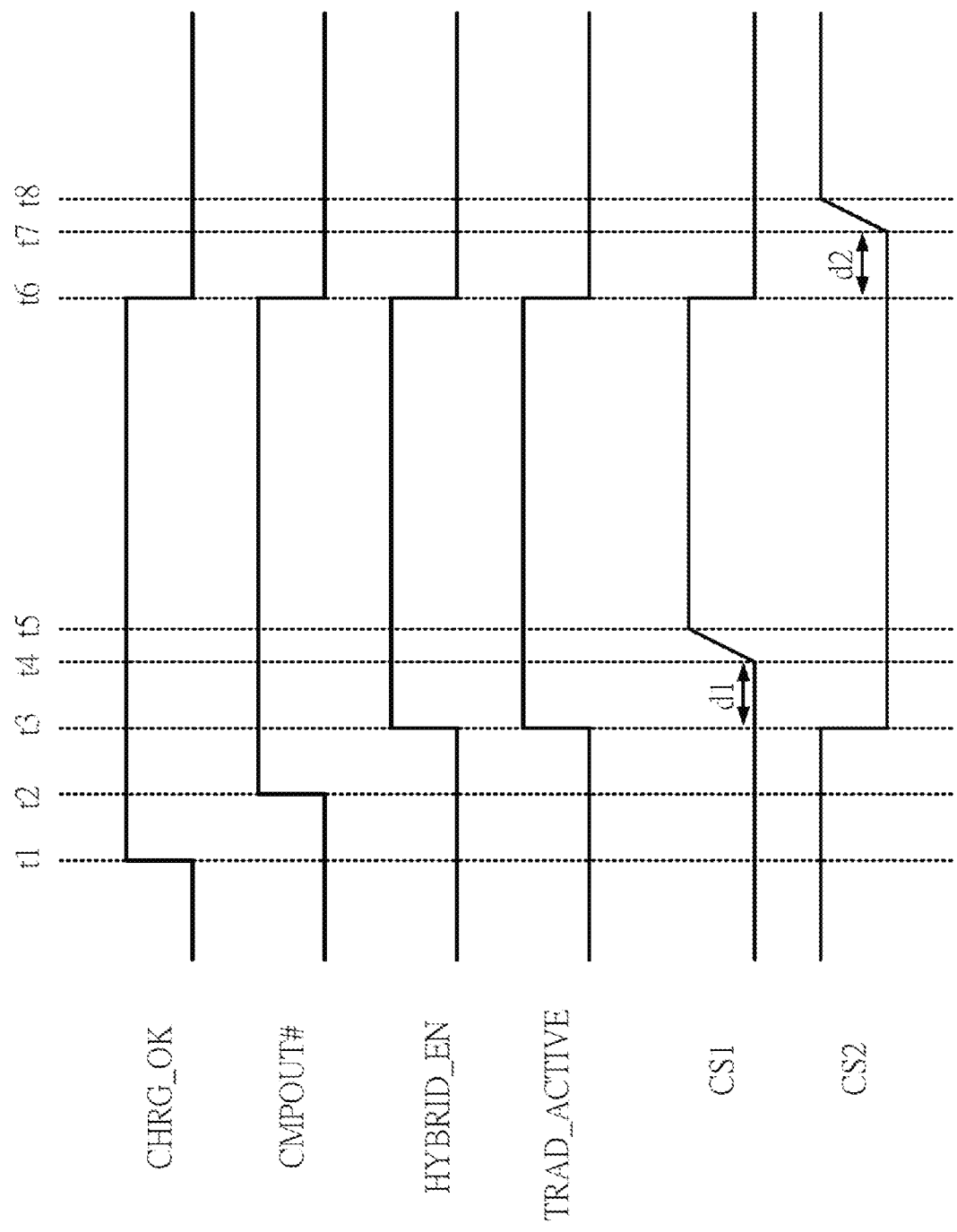

CHARGING CIRCUIT AND CONTROL METHOD THEREOF

CROSS-REFERENCE TO RELATED APPLICATION

This application claims the priority benefit of Taiwan application serial No. 106108778, filed on Mar. 16, 2017. The entirety of the above-mentioned patent application is hereby incorporated by reference herein and made a part of specification.

BACKGROUND OF THE INVENTION

Field of the Invention

The disclosure relates to a charging circuit and control method thereof, and more particularly, to a charging circuit supporting multiple charging modes and the control method thereof.

Description of the Related Art

As performances of various portable electronic devices improve and battery capacities increase, in order to support a wider range input voltages, the voltage is boosted by a voltage converter to charge a post-stage system and a battery in the conventional charging architecture. However, converter components in this architecture have to withstand high current, thus the temperature of the architecture rises.

BRIEF SUMMARY OF THE INVENTION

A charging circuit applied to a post-stage circuit is disclosed. The charging circuit comprises: a power converting circuit, used to receive an external voltage, and convert the external voltage to a charging voltage; a power storage circuit, electronically coupled to the power converting circuit, used to receive the charging voltage to store the power; a switching circuit, electronically coupled to the power converting circuit and the power storage circuit; and a processing circuit, electronically coupled to the switching circuit, used to control the charging circuit to operate in a first mode or a second mode, wherein, when the charging circuit is operated in the first mode, the external voltage supplies power to the post-stage circuit; when the charging circuit is operated in the second mode, the charging voltage supplies power to the post-stage circuit.

A control method of the charging circuit is disclosed. The control method comprises: comparing an external voltage with a charging voltage by a processing circuit; converting the external voltage to the charging voltage to supply power to a storage circuit by a power converting circuit; when the external voltage is higher than the charging voltage, the charging circuit is operated in a first mode via the processing circuit, when the external voltage is lower than the charging voltage, the charging circuit is operated in second mode via the processing circuit; in the first mode, the first end of the power converting circuit is coupled to the post-stage circuit by a switching circuit, so as to the external voltage supply power to the post-stage circuit; and in the second mode, the second end of the power converting circuit is coupled to the post-stage circuit by the switching circuit, and then the charging voltage supplies power to the post-stage circuit.

BRIEF DESCRIPTION OF THE DRAWINGS

FIG. 5 is a control waveform diagram of a processing circuit according to an embodiment.

DETAILED DESCRIPTION OF THE EMBODIMENTS

In the disclosure, terms "connect" or "couple" means interaction or operation between two or more components, which also means "electronically connect" or "electronically couple". Moreover, terms "first", "second" and so on are used to distinguish components or operations with same technology. Unless the context is clearly specified, the term is not used to limit the order or the sequence, nor used to limit the disclosure.

Figure 1:
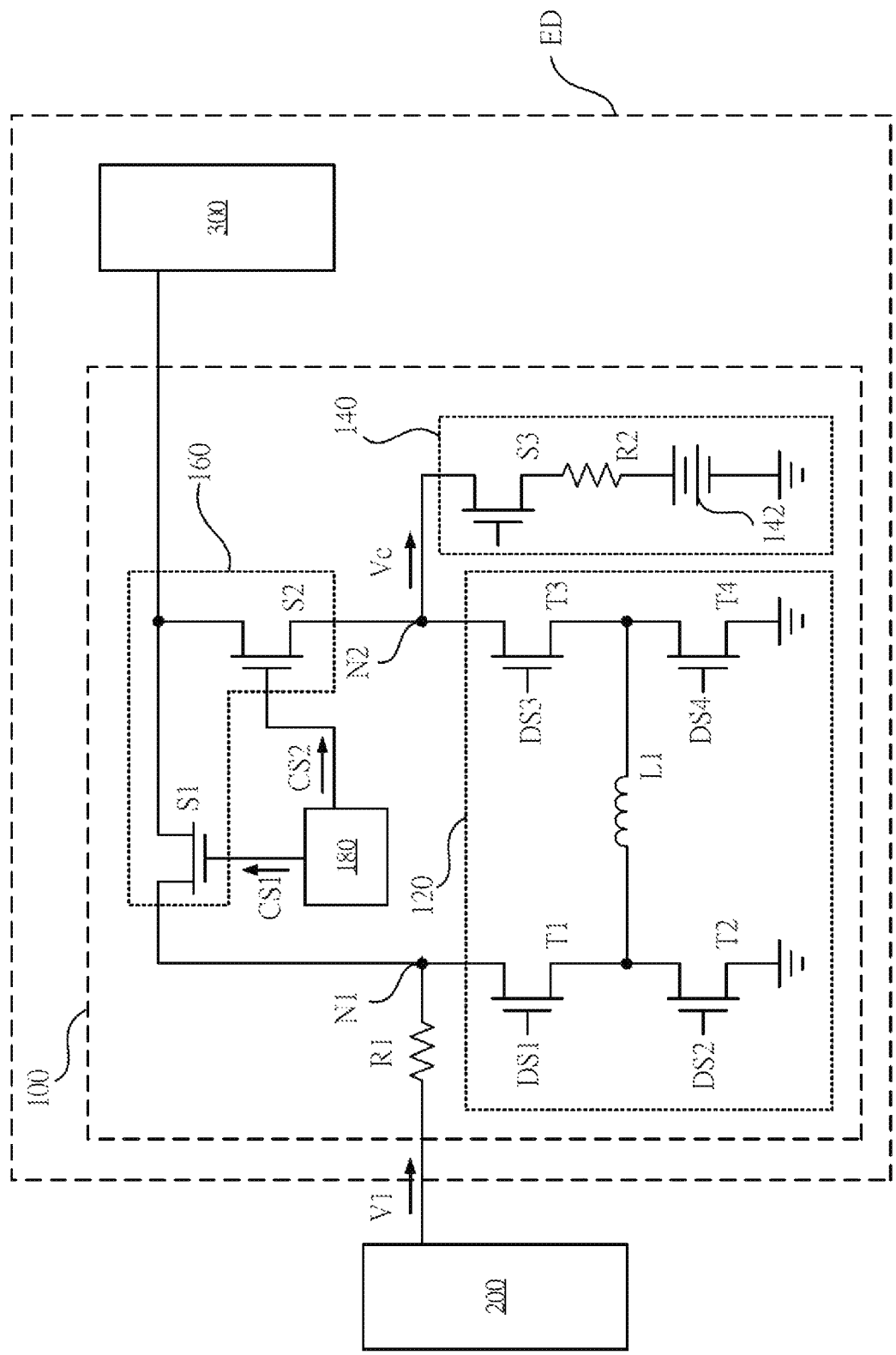
FIG. 1 is a schematic diagram of a charging architecture of an electronic device according to an embodiment.

Please refer to FIG. 1. FIG. 1 is a schematic diagram of a charging architecture of an electronic device ED according to an embodiment. In the embodiment, the electronic device ED includes a charging circuit 100 and a post-stage circuit 300. The post-stage circuit 300 receives the energy from an external device 200 or an energy storage unit of the charging circuit 100 via the corresponding operation of the charging circuit 100. In the embodiment, the external device 200 is one of various types of adapters, such as an adapter that has USB Power Delivery (PD) function or other power delivery function, and used to supply an external voltage V1 to the charging circuit 100. As shown in FIG. 1, the charging circuit 100 is connected to the external device 200 via the Universal Serial Bus (USB) interface to achieve a two-way transmission of energy. In one embodiment, the charging circuit 100 is connected to the external device 200 via a USB Type-C, or other USB standards.

In the embodiment, the charging circuit 100 includes a power converting circuit 120, a power storage circuit 140, a switching circuit 160 and a processing circuit 180. A first end N1 of the power converting circuit 120 is electronically coupled to the external device 200 via a resistor R1. A second end N2 of the power converting circuit 120 is electronically coupled to the power storage circuit 140. The switching circuit 160 is electronically coupled to the power converting circuit 120 and the post-stage circuit 300, and selectively conducts the first end N1 of power converting circuit 120 or the second end N2 of the power converting circuit 120 to the post-stage circuit 300. The processing circuit 180 is electronically coupled to the switching circuit 160, and outputs control signals CS1, CS2 to the switching circuit 160.

In the embodiment, the first end N1 of the power converting circuit 120 receives the external voltage V1 from the external device 200. The external voltage V1 is converted to a charging voltage Vc. The charging voltage Vc is outputted to second end N2 of the power converting circuit 120. As shown in FIG. 1, in one embodiment, the power converting circuit 120 includes a BUCK/BOOST converter.

In one embodiment, the power converting circuit 120 includes transistors T1~T4 and an inductance unit L1. In an embodiment, the transistors T1~T4 are Metal-Oxide-Semiconductor Field-Effect Transistors (MOSFET), Insulated Gate Bipolar Transistors (IGBT), Bipolar Junction Transistors (BJT) or switching units. A first end of the transistor T1 is electronically coupled to the first end N1 of the power converting circuit 120. A first end of the transistor T2 is electronically coupled to a second end of the transistor T1. A second end of the transistor T2 is grounding. A first end of the transistor T3 is electronically coupled to the second end N2 of the power converting circuit 120. A first end transistor T4 is electronically coupled to a second end of the transistor T3. A second end of the transistor T4 is grounding. A first end of the inductance unit L1 is electronically coupled to the second end of the transistor T1. A second end of the inductance unit L1 is electronically coupled to the second end of the transistor T3.

The driving signals DS1~DS4 are adjusted suitably to turn on or turn off the transistors T1~T4, and then the power converting circuit 120 is operated in a buck mode or in a boost mode and the voltage level of the output voltage is adjusted correspondingly. When the external voltage V1 is higher than the charging voltage Vc, the BUCK/BOOST converter operates in the buck mode to decrease the external voltage V1. When the external voltage V1 is lower than the charging voltage Vc, the BUCK/BOOST converter operates in the boost mode to increase the external voltage V1.

The power storage circuit 140 includes an energy storage battery 142, a resistance R2 and a switching unit S3. The energy storage battery 142 is electronically coupled to the second end N2 of the power converting circuit 120 via the resistance R2 and the switching unit S3. When the switching unit S3 is turned on, the energy storage battery 142 receives the charging voltage Vc that outputted by the power converting circuit 120 via the resistance R2 and the switching unit S3 to store the energy.

In one embodiment, the switching circuit 160 includes a switching unit S1 and a switching unit S2. The switching unit S1 is electronically coupled between the first end N1 of the power converting circuit 120 and the post-stage circuit 300. A control end of the switching unit S1 is used to receive the control signal CS1 from the processing circuit 180 to selectively turn on or turn off the switching unit S1. The switching unit S2 is electronically coupled between the second end N2 of the power converting circuit 120 and the post-stage circuit 300. A control end of the switching unit S2 is used to receive the control signal CS2 from the processing circuit 180 to selectively turn on or turn off the switching unit S2.

The processing circuit 180 respectively turn on or turn off the switching unit S1 and the switching unit S2 via the control signals CS1, CS2, and to control the charging circuit 100 to be operated in the different mode to supply power to the energy storage battery 142 and the post-stage circuit 300. The following paragraphs will explain the detailed operation of charging circuit 100 in accordance with figures.

Figure 2:
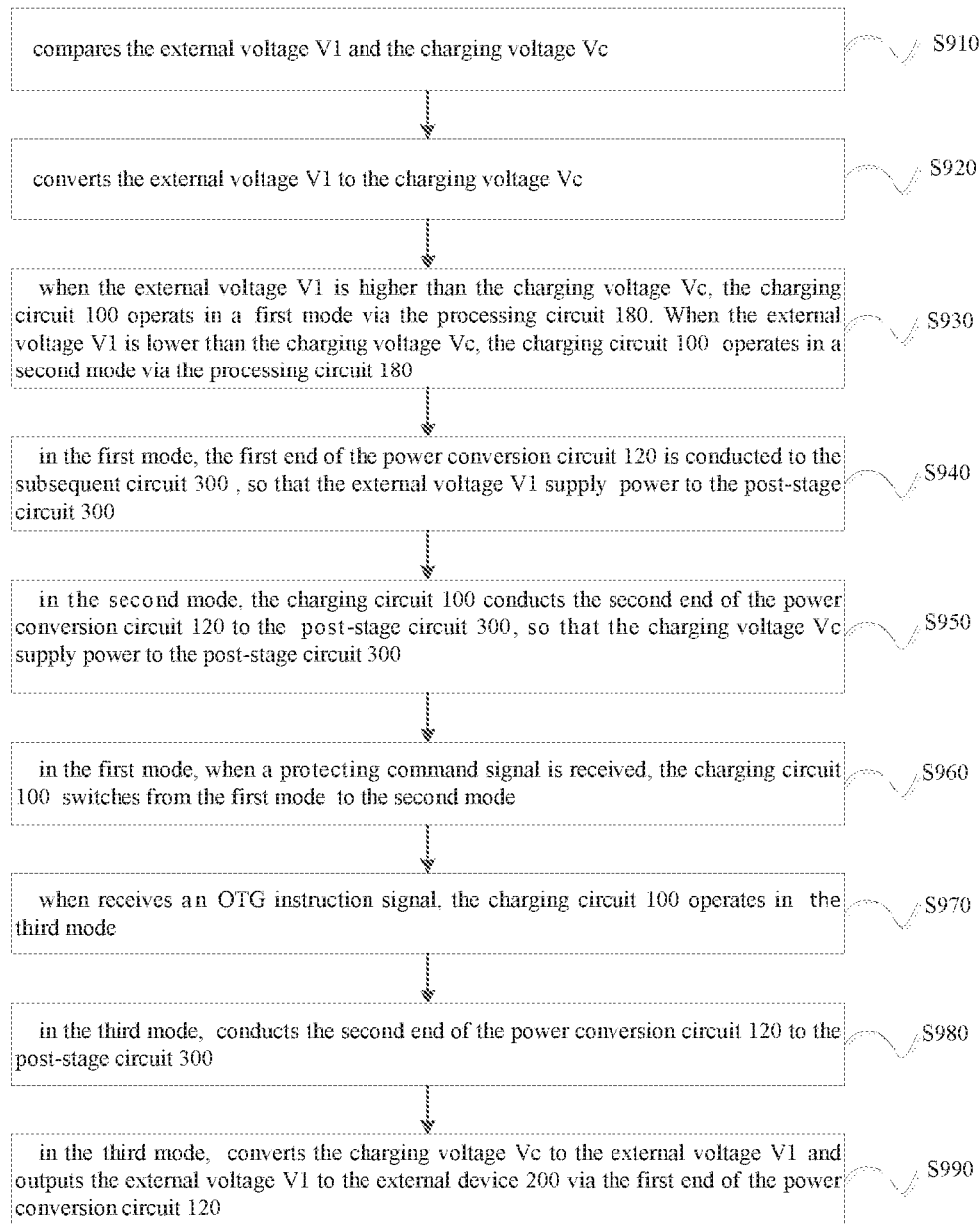
FIG. 2 is a control method of a charging circuit according to an embodiment.

Please refer to FIG. 2. FIG. 2 is a control method 900 of a charging circuit 100 according to an embodiment. In order to describe simple and clearly, the control method 900 is illustrated along with the charging circuit 100 in FIG. 1. Persons having ordinary skill in the art may make various modifications and changes without departing from the scope. As shown in FIG. 2, the control method 900 includes step S910, step S920, step S930, step S940, and step S950.

In step S910, the charging circuit 100 compares the external voltage V1 and the charging voltage Vc via the processing circuit 180. In one embodiment, the charging circuit 100 compares sampling signals of the external voltage V1 and the charging voltage Vc via a comparator of the processing circuit 180 to determine values of the external voltage V1 and the charging voltage Vc.

In step S920, the charging circuit 100 converts the external voltage V1 to the charging voltage Vc via the power converting circuit 120 and charges the energy storage battery 142 of the power storage circuit 140.

In step S930, when the external voltage V1 is higher than the charging voltage Vc, the charging circuit 100 operates in a first mode via the processing circuit 180. When the external voltage V1 is lower than the charging voltage Vc, the charging circuit 100 operates in a second mode via the processing circuit 180.

In step S940, in the first mode, the first end of the power converting circuit 120 is conducted to the post-stage circuit 300 by the switching circuit 160, and then the external voltage V1 supplies power to the post-stage circuit 300.

Figure 3:
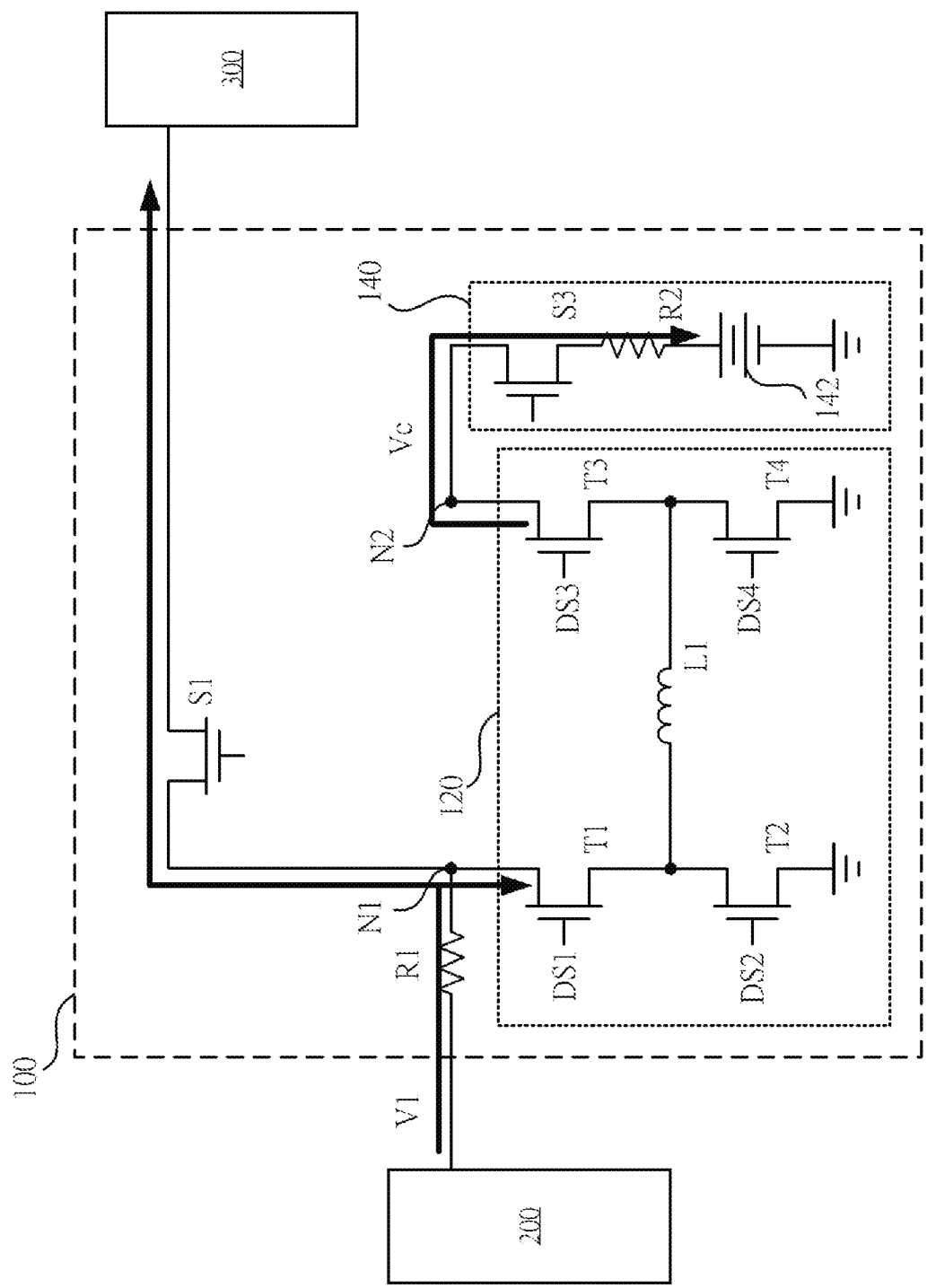
FIG. 3 is a schematic diagram that a charging circuit operates in a first mode according to an embodiment.

FIG. 3 is a schematic diagram that the charging circuit 100 operates in the first mode according to an embodiment. As shown in FIG. 3, in the first mode, the processing circuit 180 outputs the control signal CS1 to turn on the switching unit S1, and then the external voltage V1 supplied by the external device 200 is outputted to the post-stage circuit 300 via a path of the resistance R1 and the switching unit S1.

Moreover, as shown in FIG. 3, in the first mode, the power converting circuit 120 receives the external voltage V1, and converts the external voltage V1 to the charging voltage Vc to charge the energy storage battery 142.

Since the power is supplied to the post-stage circuit 300 without buck/boost converting by the power converting circuit 120, the whole currents and temperatures in the power converting circuit 120 are reduced, and then requirements of current resistance and temperature resistance of components of the power converting circuit 120 is reduced.

Please refer to FIG. 2 again. In step S950, in a second mode, the charging circuit 100 conducts the second end of the power converting circuit 120 to the post-stage circuit 300 by the switching circuit 160, and then the charging voltage Vc supplies power to the post-stage circuit 300.

Figure 4A:
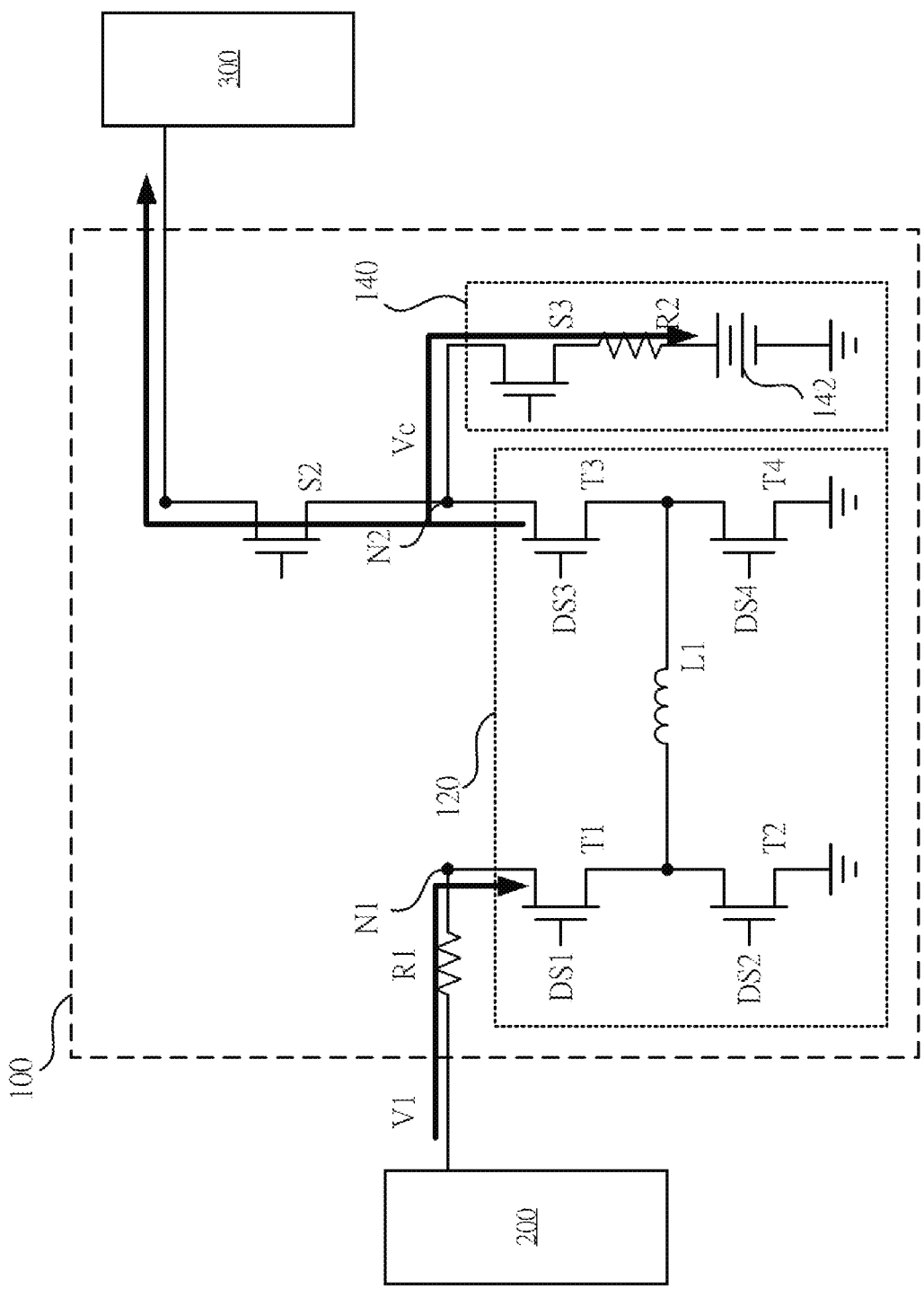
FIG. 4A is a schematic diagram that a charging circuit operates in a second mode according to an embodiment.

Please refer to FIG. 4A. FIG. 4A is a schematic diagram that the charging circuit 100 operates in a second mode according to an embodiment. As shown in FIG. 4A, in the second mode, the processing circuit 180 outputs the control signal CS2 to control the switching unit S2 to be turned on. The power converting circuit 120 receives the external voltage V1, converts the external voltage V1 to the charging voltage Vc and outputs the charging voltage Vc to the second end of the power converting circuit 120. Therefore, the power is transmitted to the post-stage circuit 300 from the second end of the power converting circuit 120 via the path of the switching unit S2. The power is transmitted to the energy storage battery 142 from the second end of the power converting circuit 120 via the path of the switching unit S3 and the resistance R2.

The charging circuit 100 is applied in a wider range of the external voltage V1. When the external voltage V1 is lower than the charging voltage Vc corresponded to the energy storage battery 142 in the electronic device ED, the external voltage V1 is converted to the charging voltage Vc and then the charging voltage Vc is supplied to the energy storage battery 142 and the post-stage circuit 300.

Figure 4B:
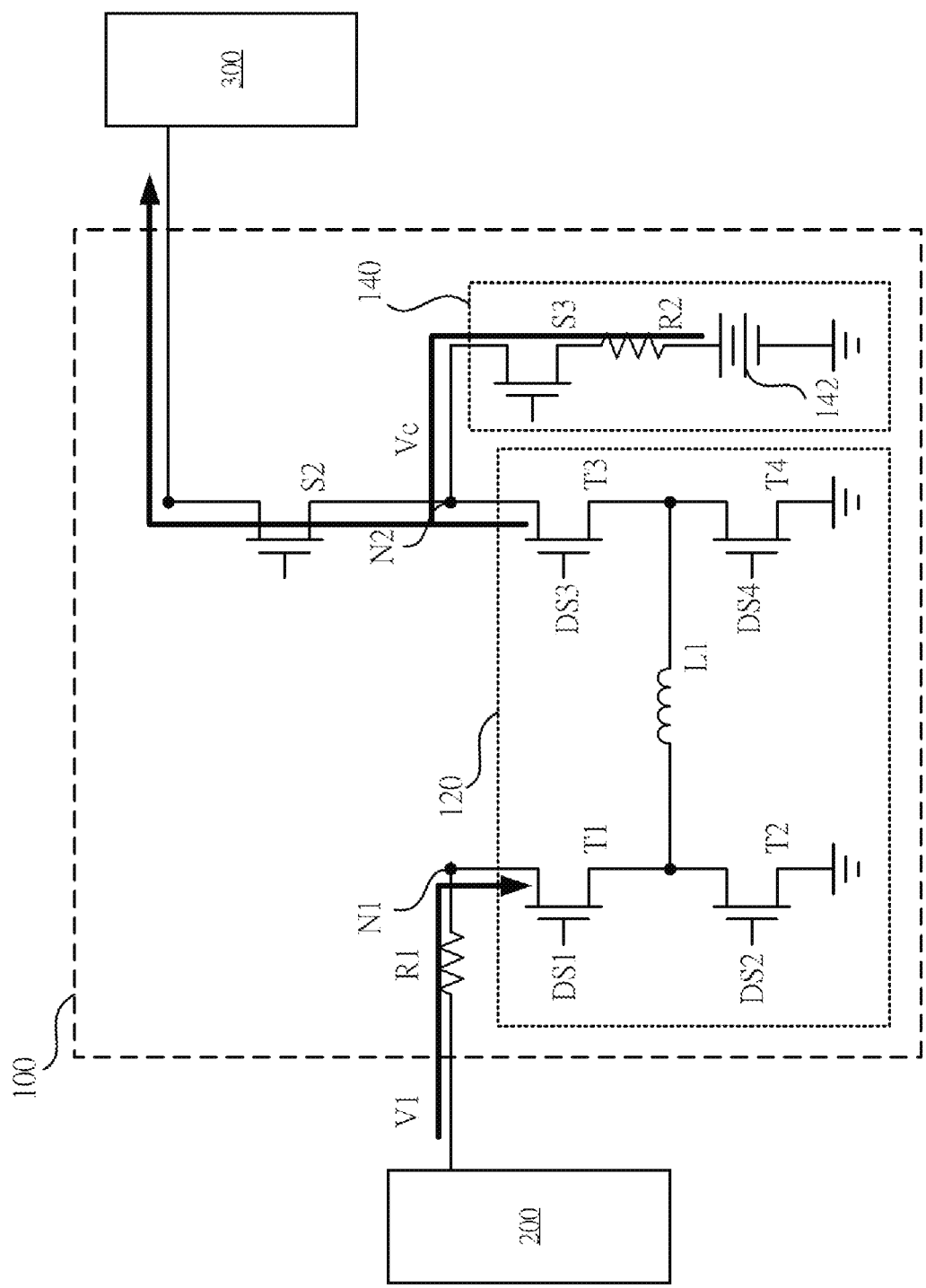
FIG. 4B is a schematic diagram that a charging circuit operates in a second mode according to an embodiment.

Please refer to FIG. 4B. FIG. 4B is a schematic diagram that the charging circuit 100 operates in a second mode according to another embodiment. As shown in FIG. 4B, in the second mode, when the external device 200 cannot meet power requirement of the post-stage circuit 300 alone, the charging circuit 100 supplies power to the post-stage circuit 300 via both the external device 200 and the power storage circuit 140. In the second mode, the power storage circuit 140 selectively operates in a charging mode or in a discharge mode according to the power supply capacity of the external device 200 and the load demand of the post-stage circuit 300, that is, the energy storage battery 142 is charged or the energy storage battery 142 outputs the power to meet the power requirement of the post-stage circuit 300.

Please refer to FIG. 2 again. In one embodiment, the control method 900 further includes step 5960. In step 5960, in the first mode, when to protecting command signal is received, the processing circuit 180 switches the charging circuit 100 from the first mode to the second mode.

Please refer to FIG. 5 together. FIG. 5 is a control waveform diagram of a processing circuit 180 according to an embodiment. The processing circuit 180 receives a CHRG_OK signal, a CMPOUT # signal and a HYBRID_EN signal to output the control signals CS1, CS2. In FIG. 5, the CHRG_OK signal is a reference signal that the power converting circuit 120 determines whether the voltage of the external device 200 is inputted to the first end of the external device 200 via a current detection resistor R1. When the voltage of the external device 200 is inputted to the first end of the power converting circuit 120 via the current detection resistor R1, the signal CHRG_OK is in a high level (such as: 1). When the voltage of the external device 200 is not inputted to the first end of the power converting circuit 120 via the current detection resistor R1, the signal CHRG_OK is in a low level (such as: 0).

The CMPOUT # signal is a reference signal that used to compare the value of the external voltage V1 and the charging voltage Vc. When the external voltage V1 of the external device 200 is lower than the charging voltage Vc, the CMPOUT # signal is in the low level (such as: 0). When the external voltage V1 of the external device 200 is higher than the charging voltage Vc, the CMPOUT # signal is in the high level (such as: 1).

The HYBRID_EN signal is a reference signal that the processing circuit 180 determines whether to charge the battery and operation mode according to the power storage circuit 140. The TRAD_ACTIVE signal is behalf of the operation mode of the charging circuit 100. When the charging circuit 100 operates in the first mode, the TRAD_ACTIVE signal is in the high level (such as: 1). Otherwise, the signal TRAD_ACTIVE is in the low level (such as: 0).

As shown in FIG. 5, at the time t1, the energy storage battery 142 is ready for charging, the CHRG_OK signal is switched from the low level to the high level. At the time t2, the charging circuit 100 detects that external voltage V1 is higher than the charging voltage Vc, at the time, the CMPOUT # signal is switched from the low level to the high level. At the time t3, the processing circuit 180 determines whether to charge the battery and operates in the first mode according to the power storage circuit 140, therefore, the HYBRID_EN signal is switched from the low level to the high level.

In one embodiment, the TRAD_ACTIVE signal is an AND Gate signal of the CHRG_OK signal, the CMPOUT # signal and the HYBRID_EN signal of the three logic gate. When all of the CHRG_OK signal, the CMPOUT # signal and the HYBRID_EN signal are in the high level, the TRAD_ACTIVE signal is in the high level. Otherwise, when one of the CHRG_OK signal, the CMPOUT # signal, and the HYBRID_EN signal is in the low level, the TRAD_ACTIVE signal is in the low level. Therefore, the CHRG_OK signal and the HYBRID_EN signal prevent a misoperation of the mode and abnormal operation of the charging circuit due to the misjudging of the system. When the protecting command signal is received, for example, when the CHRG_OK signal or the HYBRID_EN signal is switched to the low level, the charging circuit 100 switches from the first mode to the second mode by the processing circuit 180.

As shown in FIG. 5, after the time t3, the charging circuit 100 operates in the first mode. At the time t3, the control signal CS2 switches from the high level to the low level and turns off the switching unit S2. In order to avoid that the switching unit S1 is turned on before the switching unit S2 is completely turned off and results in that the high external voltage V1 is outputted to charge the power storage circuit 140 directly, after the control signal CS1 delays a period time of d1, the control signal CS1 is gradually increased from the low level to the high level to turn on the switching unit S1 at the time t4.

In order to avoid that the external device 200 generates inrush current at the moment and charges the large capacitive of the post-stage circuit 300 and leads to a connector or a power transistor in the circuit burned out when the switching unit S1 is turned on, the switching unit is soft started at the time t4 to the time t5, and the voltage level of the control signal CS1 is gradually increased to control the switching unit S1 to be operated in a linear region. The voltage level is used to control the value of the conducted current to avoid the inrush current is generated while the switching unit S1 is turn on.

At the time t6, if one of the CHRG_OK signal, the CMPOUT # signal and the HYBRID_EN signal is switched to the low level, the TRAD_ACTIVE signal is switched to the low level synchronously. At the time, the processing circuit 180 controls the charging circuit 100 switch from the first mode to the second mode. At the time t6, the control signal CS1 is switched from the high level to the low level to turn off the switching unit S1. In order to avoid that the high external voltage V1 is inputted to charge the power storage circuit 140 directly due to that both the switching unit S1, S2 are turned on, the control signal CS2 needs to be delayed for a period time of d2, and at the time t7 the control signal CS2 is gradually increased from the low level to the high level to turn off the switching unit S2

When the switching unit S2 is turned on, in order to avoid that the instantaneous large current from the post-stage circuit 300 flows to the power storage circuit 140 to charge the energy storage battery 142 to reduce the life of the energy storage battery 142 and damage the energy storage battery 142. At the time t7 to the time t8, the soft start is opened, and the voltage level of the control signal CS2 is gradually increased to control the switching unit S2 operate in the liner region. The voltage level is used to control the value of the conducted current to avoid the inrush current is generated at the moment that the switching unit S2 is turned on.

At the period times of d1, d2 that both the switching units S1, S2 are turned off, the energy storage battery 142 supplies power to the post-stage circuit 300 via a body diode of the switching unit S2.

Please refer to FIG. 2 again. As shown in FIG. 2. In one embodiment, the control method 900 further includes step S970, step S980 and step S990. In step S970, when the charging circuit 100 receives an OTG instruction signal, the charging circuit 100 operates in the third mode via the processing circuit 180.

In one embodiment, the external device 200 outputs the OTG instruction signal to the charging circuit 100 via the USB interface, or the processing circuit 180 informs the charging circuit 100 that the external device 200 supports standards of USB On-The-Go. After the external device 200 communicates with the electronic device ED, whether to control the charging circuit 100 operate in the third mode is determined, and the energy storage battery 142 supplies the power to the external device 200. In one embodiment, the external device 200 is, but not limited to, a mouse, a keyboard, a speaker, or a portable power source.

In step S980, in the third mode, the charging circuit 100 conducts the second end of the power converting circuit 120 to the post-stage circuit 300 by the switching circuit 160, and then the power storage circuit 140 supplies power to the post-stage circuit 300.

In step S990, in the third mode, the charging circuit 100 converts the charging voltage Vc to the external voltage V1 by the power converting circuit 120, and the first end of the power converting circuit 120 outputs the external voltage V1 to the external device 200.

Figure 6:
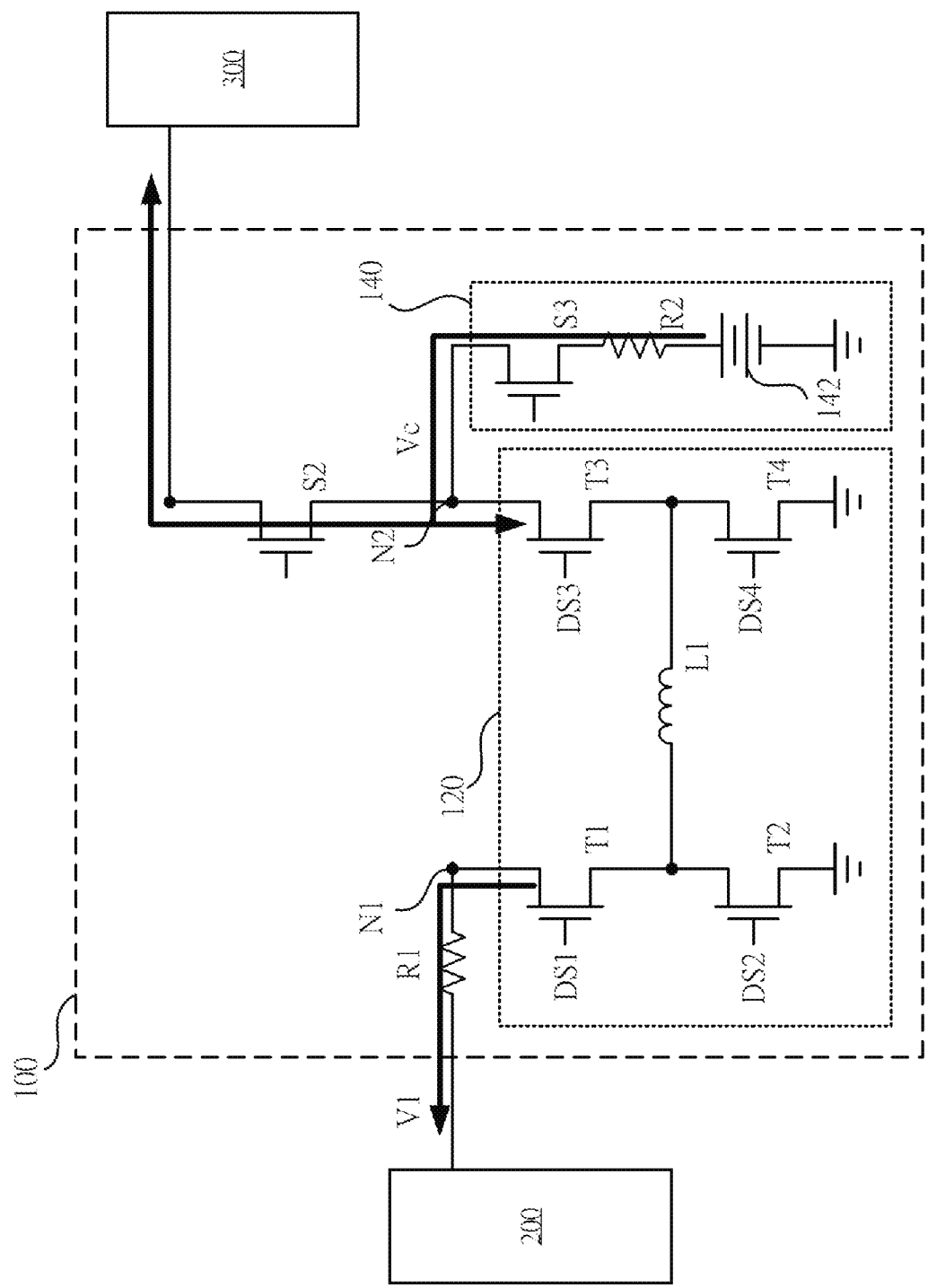
FIG. 6 is a schematic diagram that a charging circuit operates in a third mode according to an embodiment.

FIG. 6 is a schematic diagram that a charging circuit 100 operates in a third mode according to an embodiment. As shown in FIG. 6, in the third mode, the processing circuit 180 outputs the control signals CS1, CS2 to control the switching unit S1 to be turned off, and the switching unit S2 to be turned on.

In the third mode, the processing circuit 180 switches the HYBRID_EN signal to the low level, and outputs an OTG function command (discharge) to the power converting circuit 120.

When the power storage circuit 140 operates in the discharging mode, the energy storage battery 142 outputs the charging voltage Vc and supplies power to the post-stage circuit 300. The power converting circuit 120 receives the charging voltage Vc from its second end, and converts the charging voltage Vc to the external voltage V1, than outputs the external voltage V1 to the external device 200 by the first end of the power converting circuit 120. Therefore, the power needed by the post-stage circuit 300 and the external device 200 are supplied simultaneously by the energy stored in the energy storage battery 142 of the power storage circuit 140.

In one embodiment, in the third mode, the driving signals DS1~DS4 are adjusted to turn on or turn off the transistors T1~T4, so as to adjust the voltage level of the external voltage V1 that is outputted to the external device 200 by the power converting circuit 120. In one embodiment, the external voltage V1 outputted by the power converting circuit 120 is between 5V~20V. Therefore, the charging circuit 100 supplies the corresponding voltage level that responsive to the type and the requirements of the external device 200.

In sum, the charging circuit 100 to is operated in one of the first mode, the second mode, and the third mode by controlling of the processing circuit 180. The power converting circuit 120, the power storage circuit 140, and the switching circuit 160 of the charging circuit 100 are cooperated in each operation mode to realize two-way power transmission between the external device 200 and the charging circuit 100. Two-way power transmission is realized in the external devices 200 with different voltage ranges via buck/boost converting of the power converting circuit 120. When the voltage level of the external voltage V1 is sufficient to supply the power to the post-stage circuit 300, the charging circuit 100 supplies the external voltage V1 to the post-stage circuit 300 directly, but not by the buck and boost converting of the power converting circuit 120, therefore, the whole current and temperature of the power converting circuit 120 is reduced and the whole conversion efficiency of the charging circuit 100 is improved.

In the embodiment, the processing circuit 180 is realized by various circuits, which is, but not limited to, a digital circuit, an analog circuit, a Microcontroller Unit (MCU), a Complex Programmable Logic Device (CPLD), or a Field-programmable gate array (FPGA).

Although the present disclosure has been described in considerable detail with reference to certain preferred embodiments thereof, the disclosure is not for limiting the scope. Persons having ordinary skill in the art may make various modifications and changes without departing from the scope. Therefore, the scope of the appended claims should not be limited to the description of the preferred embodiments described above.

What is claimed is:

1. A charging circuit, applied to a post-stage circuit, comprising:
  a power converting circuit, configured to receive an external voltage and convert the external voltage to a charging voltage;
  a power storage circuit, electronically coupled to the power converting circuit, configured to receive the charging voltage to store power;
  a switching circuit, electronically coupled to the power converting circuit and the power storage circuit; and
  a processing circuit, electronically coupled to the switching circuit, configured to control the charging circuit to operate in a first mode or a second mode,
  wherein, when the charging circuit is operated in the first mode, the external voltage supplies power to the post-stage circuit, and when the charging circuit is operated in the second mode, the charging voltage supplies power to the post-stage circuit.

2. The charging circuit according to claim 1, wherein, when the processing circuit controls the charging circuit to operate in a third mode, the power storage circuit supplies power to the post-stage circuit, the power converting circuit further receives the charging voltage outputted by the power storage circuit, and the charging voltage is converted to the external voltage to output to an external device.

3. The charging circuit according to claim 1, wherein the switching circuit comprises:
  a first switching unit, electronically coupled between a first end of the power converting circuit and the post-stage circuit; and
  a second switching unit, electronically coupled between a second end of the power converting circuit and the post-stage circuit;
  wherein when the external voltage is higher than the charging voltage, the processing circuit outputs a first control signal to turn on the first switching unit, and outputs a second control signal to turn off the second switching unit, when the external voltage is lower than the charging voltage, the processing circuit outputs the first control signal to turn off the first switching unit, and outputs the second control signal to turn on the second switching unit.

4. The charging circuit according to claim 3, wherein the processing circuit is configured to receive a first reference signal, a second reference signal, and a third reference signal, the first reference signal is configured to determine whether the energy storage battery is in a chargeable state, the second reference signal is configured to compare the value of the external voltage and the charging voltage, the third reference signal is configured to determine whether to charge the energy storage battery, the processing circuit outputs the first control signal and the second control signal according to the first reference signal, the second reference signal, and the third reference signal.

5. The charging circuit according to claim 3, wherein when the processing circuit switches the second control signal from a high level to a low level to turn off the second switching unit, the first control signal gradually increases from the low level to the high level after being delayed for a period of time to turn on the first switching unit, when the processing circuit switches the first control signal from a high level to a low level to turn off the first switching unit, the second control signal gradually increases from the low level to the high level after being delayed for a period of time to turn on the second switching unit.

6. The charging circuit according to claim 1, wherein in the first mode, the charging circuit receives a protecting command signal, the processing circuit switches the charging circuit from the first mode to the second mode.

7. The charging circuit according to claim 6, wherein the power converting circuit comprises:
- a first transistor, a first end of the first transistor electronically coupled to the first end of the power converting circuit;
- a second transistor, a first end of the second transistor electronically coupled to the second end of the first transistor, and a second end of the second transistor electronically coupled to a ground;
- a third transistor, a first end of the third transistor electronically coupled to the second end of the power converting circuit;
- a fourth transistor, a first end of the fourth transistor electronically coupled to the second end of the third transistor, a second end of the fourth transistor electronically connected to the ground; and
- an inductance unit, a first end of the inductance unit electronically coupled to the second end of the first transistor, a second end of the inductance unit electronically coupled to the second end of the third transistor.

8. A control method of a charging circuit comprising:
- comparing an external voltage with a charging voltage by a processing circuit;
- converting the external voltage to the charging voltage to supply power to a storage circuit by a power converting circuit;
- wherein, when the external voltage is higher than the charging voltage, the charging circuit is operated in a first mode via the processing circuit, when the external voltage is lower than the charging voltage, the charging circuit is operated in a second mode via the processing circuit;
- in the first mode, the first end of the power converting circuit is coupled to the post-stage circuit by a switching circuit, and then the external voltage supplies power to the post-stage circuit; and
- in the second mode, the second end of the power converting circuit is coupled to the post-stage circuit by the switching circuit, and then the charging voltage supplies power to the post-stage circuit.

9. The control method according to claim 8, further comprising:
- the processing circuit controlling the charging circuit to operate in a third mode when an On-The-Go instruction signal is received;
- the switching circuit coupling the second end of power converting circuit to the post-stage circuit, and then the power storage circuit supplying power to the post-stage circuit in the third mode; and
- the power converting circuit converting the charging voltage to the external voltage, and outputting the external voltage to an external device via the first end of the power converting circuit.

10. The control method according to claim 8, further comprising:
- the processing circuit switching the charging circuit from the first mode to the second mode when a protecting command signal is received in the first mode.

* * * * *